US009486808B2

(12) United States Patent
Oliveira Nascimento Costa et al.

(10) Patent No.: US 9,486,808 B2
(45) Date of Patent: Nov. 8, 2016

(54) PROCESS OF OBTAINING PLASTIC COMPOUND BASED ON FIBROUS PLANT MATERIAL, PLASTIC COMPOUND BASED ON FIBROUS PLANT MATERIAL OBTAINED AND EQUIPMENT FOR EXTRUSION OF PLASTIC COMPOUND BASED ON FIBROUS PLANT MATERIAL

(71) Applicants: Luiz Ribeiro Oliveira Nascimento Costa, Sao Paulo (BR); Omar Natam Klemp Rego, Sao Paulo (BR); Renato Batista, Jr., Sao Paulo (BR); Dijalma Oliveira Rocha, Jr., Sao Paulo (BR)

(72) Inventors: Luiz Ribeiro Oliveira Nascimento Costa, Sao Paulo (BR); Omar Natam Klemp Rego, Sao Paulo (BR); Renato Batista, Jr., Sao Paulo (BR); Dijalma Oliveira Rocha, Jr., Sao Paulo (BR)

( * ) Notice: Subject to any disclaimer, the term of this patent is extended or adjusted under 35 U.S.C. 154(b) by 0 days.

(21) Appl. No.: 14/538,091

(22) Filed: Nov. 11, 2014

(65) Prior Publication Data
US 2015/0133585 A1    May 14, 2015

(30) Foreign Application Priority Data
Nov. 12, 2013 (BR) ..................... BR1020130290840

(51) Int. Cl.
| | | |
|---|---|---|
| B29C 47/00 | (2006.01) | |
| B29C 39/38 | (2006.01) | |
| B02C 21/00 | (2006.01) | |
| B29B 7/90 | (2006.01) | |
| B29B 7/00 | (2006.01) | |
| B29B 7/42 | (2006.01) | |
| B29B 7/82 | (2006.01) | |
| B29B 7/84 | (2006.01) | |
| B29B 7/92 | (2006.01) | |
| B29B 13/06 | (2006.01) | |
| B29C 47/80 | (2006.01) | |
| B29C 47/82 | (2006.01) | |
| B29K 101/12 | (2006.01) | |
| B29K 311/10 | (2006.01) | |
| B29K 105/00 | (2006.01) | |

(52) U.S. Cl.
CPC .............. *B02C 21/00* (2013.01); *B29B 7/007* (2013.01); *B29B 7/42* (2013.01); *B29B 7/82* (2013.01); *B29B 7/845* (2013.01); *B29B 7/905* (2013.01); *B29B 7/92* (2013.01); *B29B 13/065* (2013.01); *B29C 47/0004* (2013.01); *B29C 47/802* (2013.01); *B29C 47/807* (2013.01); *B29C 47/827* (2013.01); *B29C 47/0009* (2013.01); *B29K 2101/12* (2013.01); *B29K 2105/0032* (2013.01); *B29K 2105/0044* (2013.01); *B29K 2311/10* (2013.01)

(58) Field of Classification Search
CPC .. B29C 47/004; B29C 39/38; B29K 2105/12
See application file for complete search history.

(56) References Cited

U.S. PATENT DOCUMENTS

| | | | | |
|---|---|---|---|---|
| 3,852,046 A * | 12/1974 | Brown | ..................... | C08J 11/06 44/535 |
| 5,516,472 A * | 5/1996 | Laver | ...................... | B27N 3/28 264/118 |
| 5,634,953 A * | 6/1997 | Wissmann | ......... | B01D 46/0058 366/75 |
| 6,284,098 B1 * | 9/2001 | Jacobsen | .................. | C08J 5/045 162/150 |
| 6,344,504 B1 * | 2/2002 | Zehner | ................ | B29C 47/0004 524/14 |
| 2002/0106498 A1 * | 8/2002 | Deaner | .................. | B27N 3/007 428/292.4 |
| 2003/0021915 A1 * | 1/2003 | Rohatgi | ................. | B27N 3/007 428/15 |
| 2006/0049541 A1 * | 3/2006 | Sutton | ................. | B29C 45/0005 264/148 |
| 2008/0113190 A1 * | 5/2008 | Keller | ................. | B29C 47/0816 428/339 |
| 2009/0236766 A1 * | 9/2009 | Rust | ......................... | B27N 3/28 264/141 |
| 2010/0004358 A1 * | 1/2010 | Hashiba | ................... | C08J 3/203 524/13 |
| 2010/0021753 A1 * | 1/2010 | Hojabr | ...................... | B32B 5/16 428/507 |
| 2010/0289175 A1 * | 11/2010 | Feichtinger | .......... | B29C 47/0021 264/211.21 |
| 2012/0071590 A1 * | 3/2012 | Parssinen | ................ | A61L 15/12 524/13 |
| 2012/0199998 A1 * | 8/2012 | Bledzki | ..................... | B29B 9/14 264/140 |
| 2012/0208933 A1 * | 8/2012 | Hamilton | ................. | C08K 7/02 524/13 |
| 2013/0093114 A1 * | 4/2013 | Rust | ..................... | B29C 47/0004 264/211.23 |
| 2013/0210965 A1 * | 8/2013 | Hamilton | ................ | C08L 97/02 524/14 |
| 2013/0237647 A1 * | 9/2013 | Yin | ......................... | C08L 23/02 524/9 |
| 2013/0303664 A1 * | 11/2013 | Malet | ..................... | C08G 69/40 524/14 |
| 2014/0302284 A1 * | 10/2014 | Hashiba | .............. | B29C 45/0005 428/156 |
| 2015/0315365 A1 * | 11/2015 | Aoki | ........................ | C08K 7/14 524/494 |

FOREIGN PATENT DOCUMENTS

| | | |
|---|---|---|
| BR | PI0701495-3 | 2/2009 |
| BR | PI0810757-2 | 12/2010 |

* cited by examiner

*Primary Examiner* — Liam J Heincer
(74) *Attorney, Agent, or Firm* — Defillo & Associates, Inc.; Evelyn A Defillo

(57) ABSTRACT

A process of obtaining plastic compound based on fibrous plant material, plastic compound based on obtained fibrous plant material and equipment for extrusion of plastic compound based on fibrous plant material. The objective is to fundamentally give to the final product a greater mechanical resistance against natural degrading agents, such as weather and infestations, and to this end, proposes changes in its procedural and manufacturing stages, in order to provide, essentially, the increase in the density of the final product, making it more compressed and maintaining its organoleptic properties unchanged.

3 Claims, 1 Drawing Sheet

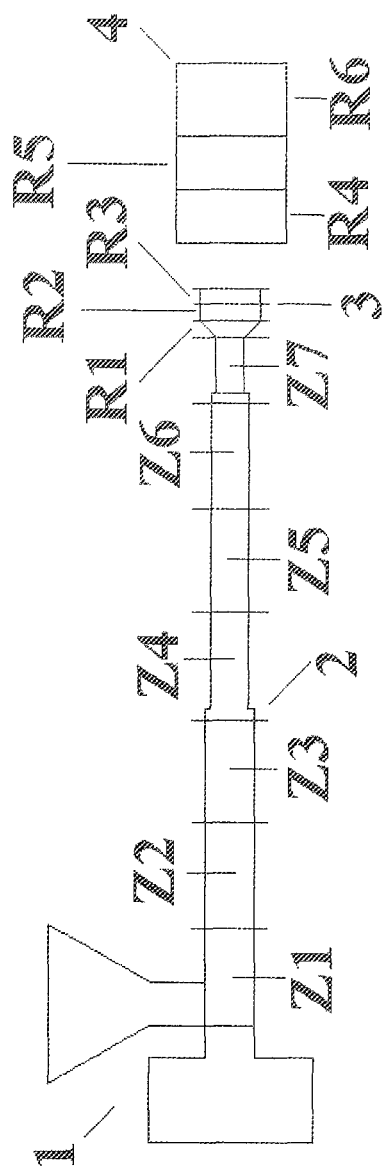

PROCESS OF OBTAINING PLASTIC COMPOUND BASED ON FIBROUS PLANT MATERIAL, PLASTIC COMPOUND BASED ON FIBROUS PLANT MATERIAL OBTAINED AND EQUIPMENT FOR EXTRUSION OF PLASTIC COMPOUND BASED ON FIBROUS PLANT MATERIAL

FIELD OF THE INVENTION

Descriptive report of Invention Patent for the process of obtaining plastic compound based on fibrous plant material, plastic compound based on fibrous plant material and equipment for extruding plastic compound based on fibrous plant material to manufacture thermoplastic polymer matrix parts with addition of fibrous plant materials of different origin, specifically of scrapped fibrous plant material.

BACKGROUND OF THE INVENTION

It is already know the current state of the art processes to obtain compounds based on plant fibers, intended for applications in the plastic wood industry (WCC-Wood Plastic Composites), which are produced by the incorporation of natural fibers, such as reinforcing fillers in thermoplastic resins, among which the most used has been the rice husk, which, in addition of increasing the mechanical properties of the products provides impermeability and resistance to the attack by UV rays, and pests such as termites, also providing in conjunction with its withdrawal from nature's ecosystems, a new concept in the production of manufactured goods with high added value.

In Patent document BRPI0701495-3 is described a process for manufacturing a material composed by rice husk mixed with fusible polymer, adding to the mixture the properties of the employed polymer, which also contributes to the elimination of toxic waste, allows the substitution of more noble materials by other material with lower cost, proposing a mixture ranging from 50% to 70% of polymer and 30% to 50% of rice husk.

The Patent document BRPI0810757-2 provides for the use of rice husk ash in polymers by extrusion process in the production of injection thermo-molded parts to replace, partially or totally, the usual mineral fillers, harmful to the environment, considering that the rice husk ash employed comes from its burning in thermoelectric power plants, which composition with up to 95% of silicon dioxide, keeps unchanged the features of the plastic waste employed in the final product mixture.

SUMMARY OF THE INVENTION

The process for obtaining plastic compound based on fibrous plant material, plastics compound based on fibrous plant material and equipment for extruding plastic compound based on fibrous plant materials, gives the final product greater mechanical resistance against natural degrading agents such as weather and infestation, and, for this, proposes process changes that provide, essentially, the increase in density, making it more compact while maintaining the integrity of its organoleptic properties.

BRIEF DESCRIPTION OF THE DRAWINGS

FIG. 1 shows an equipment for the extrusion of plastic compound based on fibrous plant material according to the present invention.

DESCRIPTION OF THE INVENTION

The process of obtaining a plastic compound based on fibrous plant material proposed herein, is defined from a grinding stage of the fibrous plant material to obtain particles of at least 6 mm, being subsequently dehumidified by means of air heating and moisture depletion, at a temperature of up to 90° C. for up to 8 hours, until it reaches a maximum of 3% of moisture being transported, with thermal insulation so there is no contact with the outside air, even the mixing stage where it is mixed with the plastic and coupling additives, sliders and coloring by centrifugation at a room temperature of up to 100° C. for a period of 15 minutes, passing the composting phase, which uses dehumidifier heated by resistances and exhaust vents with filters to remove moisture, with the mixture and homogenization being made by means of a mixer that integrates the plastic to the fiber.

The plastic compound based on fibrous plant material proposed herein, has a composition formed from: 20% to 70% of fibers per kg; 30% to 80% of plastic per kg; 2% of coupling additive per kg; 1% of sliding additive per kg; 2% of anti-UV additive per kg, and 2% of coloring additive per kg.

Equipment (1) for the extrusion of plastic compound based on fibrous plant material proposed herein, as schematically illustrated in FIG. 1 is provided with compactor screw (2), which has seven heating zones, with the first zone (Z1) having a temperature ranging between 70° C. and 90° C.; the second zone (Z2) with a temperature ranging between 90° C. and 110° C., the third zone (Z3) with a temperature ranging between 110° C. and 130° C., the fourth (Z4), fifth (Z5) and sixth (Z6) zones with temperatures ranging between 130° C. and 170° C., and the seventh zone (Z7) with temperature between 180° C. and 220° C., obtaining from the consistency differences and consequently the displacement speed of the material in each zone, compacting the material, with the release of gases and moisture, which are removed in two stages of degassing by means of a vacuum pump being further provided at the outlet (3) of the compacting screw, three cooling regions, being the first region (R1) with a temperature between 100° C. and 80° C.; the second region (R2) with a temperature between 90° C. and 70° C., and the third region (R3) with temperature between 70° C. and 50° C., and then the molten material is admitted to a tool (4), wherein the compound is compressed, for final disposal of gases and final molding of the mass into three subsequent cooling regions, and the fourth region (R4) with temperature between 26° C. and 14° C.; the fifth region (R5) with temperature between 14° C. to 10° C. and the sixth region (R6) with temperature between 10° C. and 6° C., providing a delay in the displacement of the material, so that the desired final density for the product can be achieved at the same time in which it is given its final shape.

What is claimed is:

1. A process for obtaining a plastic compound based on a fibrous plant material comprising the steps of:
   grinding the fibrous plant material to obtain particles of at least 6 mm;
   dehumidifying the particles by using air heating and moisture depletion at temperatures of up to 90° C. to provide up to 3% of moisture;
   transporting the dehumidified particles with a thermal insulation so there is no contact with an outside air;
   mixing the dehumidified particles with a plastic, coupling additives, sliding and coloring additives to form a mixture;

passing the mixture to a compactor screw, wherein in the compactor screw the mixture is molten by:
  heating in a first zone having a temperature between 70° C. and 90° C.;
  heating in a second zone with a temperature ranging between 90° C. and 110° C.;
  heating in a third zone with a temperature ranging between 110° C. and 130° C.;
  heating in a fourth zone temperatures ranging between 130° C. and 170° C.;
  heating in a fifth zone with temperatures ranging between 130° C. and 170° C.;
  heating in a sixth zones with temperatures ranging between 130° C. and 170° C.; and
  heating in a seventh zone with temperature between 180° C. and 220° C.;
compressing the molten mixture to release gases by:
  passing the molten mixture to a first cooling region having temperatures between 100° C. and 80° C.;
  passing the molten mixture to a second cooling region having temperature between 90° C. and 70° C.;
  passing the molten mixture to a third cooling region having temperature between 70° C. and 50° C.,
molding the molten mixture on a casting device by:
  passing the molten mixture to a fourth cooling region having temperatures between 26° C. and 14° C.;
  passing the molten mixture to a fifth cooling region with temperature between 14° C. and 10° C., and
  passing the molten mixture to a sixth cooling region with temperature between 10° C. and 6° C.

2. The process according to claim 1, wherein the mixture includes from 20% to 70% of a fiber per kg; 30% to 80% of a plastic per kg; 2% of a coupling additive per kg; 1% of a sliding additive per kg; 2% of an anti-UV additive per kg, and 2% of a coloring additive per kg.

3. A process for obtaining a plastic compound based on a fibrous plant material comprising the steps of:
  grinding the fibrous plant material to obtain particles of at least 6 mm;
  dehumidifying the particles by using air heating and moisture depletion at temperatures of up to 90° C. to provide up to 3% of moisture;
  transporting the dehumidified particles with a thermal insulation so there is no contact with an outside air;
  mixing the dehumidified particles with a plastic, coupling additives, sliding and coloring additives, by centrifugation at room temperature;
  passing mixture to a compactor screw, wherein in the compactor screw the mixture is molten by:
    heating in a first zone having a temperature between 70° C. and 90° C.;
    heating in a second zone with a temperature ranging between 90° C. and 110° C.;
    heating in a third zone with a temperature ranging between 110° C. and 130° C.;
    heating in a fourth zone with temperatures ranging between 130° C. and 170° C.;
    heating in a fifth zone with temperatures ranging between 130° C. and 170° C.;
    heating in a sixth zones with temperatures ranging between 130° C. and 170° C.; and
    heating in a seventh zone with temperature between 180° C. and 220° C.;
  releasing the gases and moisture in two stages of degassing by using a vacuum pump provided at an outlet of the compacting screw;
  compressing the molten mixture to release gases by:
    passing the molten mixture to a first cooling region having temperatures between 100° C. and 80° C.;
    passing the molten mixture to a second cooling region with temperature between 90° C. and 70° C.;
    passing the molten mixture to a third cooling region with temperature between 70° C. and 50° C.,
  molding the molten mixture on a casting device by:
    passing the molten mixture to a fourth cooling region having temperatures between 26° C. and 14° C.;
    passing the molten mixture to a fifth cooling region with temperature between 14° C. and 10° C., and
    passing the molten mixture to a sixth cooling region with temperature between 10° C. and 6° C.

* * * * *